United States Patent [19]
Gaigg et al.

[11] 3,932,720
[45] Jan. 13, 1976

[54] GAS-BLAST INSULATED, ENCAPSULATED HIGH-VOLTAGE SWITCHING INSTALLATION WITH REMOVABLE COLLECTING RAILS

[75] Inventors: Wilhelm Gaigg; Vladimir Gutalj, both of Oberentfelden, Switzerland

[73] Assignee: Sprecher & Schuh AG, Switzerland

[22] Filed: Sept. 26, 1974

[21] Appl. No.: 509,731

[30] Foreign Application Priority Data
Sept. 28, 1973  Switzerland.................... 13907/73

[52] U.S. Cl. ........................ 200/148 R; 200/148 B
[51] Int. Cl.² ...................................... H01H 33/54
[58] Field of Search ........ 200/148 R, 148 B, 148 D, 200/145

[56] References Cited
UNITED STATES PATENTS

| | | | |
|---|---|---|---|
| 3,348,001 | 10/1967 | Upton, Jr. et al............. | 200/148 R |
| 3,794,799 | 2/1974 | Spindle et al. .................. | 200/148 B |

FOREIGN PATENTS OR APPLICATIONS

| | | | |
|---|---|---|---|
| 1,483,830 | 5/1967 | France ............................ | 200/148 R |
| 1,578,350 | 7/1969 | France ............................ | 200/148 B |
| 1,230,115 | 12/1966 | Germany........................ | 200/148 R |

*Primary Examiner*—Robert S. Macon
*Attorney, Agent, or Firm*—Waters, Schwartz & Nissen

[57] ABSTRACT

A gas-blast insulated, encapsulated high-voltage switching installation with removable bus bars wherein the switching installation contains components consisting of housings with flanged connections and internal elements secured therein as partitions by means of conical support insulators and forming pressure gas tight compartments and wherein the bus bars contain disconnectors as well as dilatation elements. At each housing of the bus bar component there are provided two oppositely situated connection flanges and in each housing there is arranged an internal conductor element. The internal conductor elements bear against one another and at least a number thereof in their housing are supported by an inwardly directed conical supporting insulator arranged at a connection flange, and wherein the internal conductor elements are mechanically and electrically connectible with one another and each connection location is located beneath a flange connection and each housing contains a pressure gas tight closable mounting opening by means of which the connection location beneath the other free connection flange is accessible.

11 Claims, 4 Drawing Figures

3,932,720

GAS-BLAST INSULATED, ENCAPSULATED HIGH-VOLTAGE SWITCHING INSTALLATION WITH REMOVABLE COLLECTING RAILS

BACKGROUND OF THE INVENTION

The present invention relates to a new and improved construction of gas-blast insulated, encapsulated high-voltage switching installation with removable bus bars wherein at such switching installation the components of such installation which consist of housings with flange connections and internal components secured as partitions by means of conical support insulators in the housings form pressure gas tight compartments and the collecting rails contain disconnectors or separators as well as dilatation elements.

There is already known to the art, for instance, a gas-blast insulated bus bar system from German patent publication No. 1,515,367 wherein bellows compartments are arranged between the individual compartments containing the bus bar branches and which are rigidly mechanically connected with stationary installation components, and in which bellows compartments there is supported at both sides in gas tight bulkhead or partition throughpassage insulators a respective internal conductor which interconnects two branches. In such or similar designed bus bar systems the dismantling of a compartment or section, for instance for revision is only possible by dismantling the collecting rail system.

In order to be able to disassemble individual components from an encapsulated gas-blast insulated high-voltage switching installation without having to dismantle the entire installation, there are oftentimes provided at the components mechanical disconnector or separator devices. A disconnector device which can be used for a bus bar system has been disclosed for instance in German patent publication No. 2,058,684. Between two neighbouring components of the installation and the bus bar system respectively, there is arranged for instance a bellows as the dilatation element and the bus bar element which connects both of the components is displaceable in a holder, so that the connection can be released after compressing together the bellows by displacing the bus bar element by means of a tool which is introduced into the formed opening. Since with bus bars or collecting rails generally the disconnectors and linear rail elements successively follow one another a bellows is required between each two such components. The pressure gas tight dilatation elements are, however, subject to disturbance and additionally quite expensive. Such bus bar system is therefore less operationally reliable and also more expensive and complicated than a system having only the absolutely required number of dilatation elements.

In Swiss Pat. No. 486,138 there is taught an electrical disconnector which can likewise be used as mechanical disconnector or separator mechanism in a bus bar system. The disconnector possesses two electrical partial disconnection paths located in series and which are formed by two contact elements which, with regard to a centrally mounted portion, can be moved towards one another and away from one another. If the contact elements are moved away from one another then the connection of the linear collecting rail elements is established. For the dismantling of a disconnector or a linear bus bar element the contact elements must be moved towards one another. If at the bus bar there should only be separated the infeed and outfeed lines, then such disconnector devices are much too complicated simply for the purpose of carrying out an easier dismantling, and even more so for the reason that by such disconnectors owing to the moved contact elements and the drive provided for such purpose there are necessary additional pressure gas tight seals or partitions or bulkheads.

SUMMARY OF THE INVENTION

It is primary object of the present invention to provide an improved construction of gas-blast insulated, encapsulated high-voltage switching installation which is not associated with the mentioned drawbacks and limitations of the prior art constructions.

Another and more specific object of the present invention aims at the provision of a new and improved construction of gas-blast insulated encapsulated high-voltage switching installation with removable bus bars wherein for revision and amplification work each individual field or zone with bus bars can be easily dismantled and reassembled and random numbers of fields can be connected-on and the switching installation thus possesses the minimum number of flanges and supporting insulators, resulting in a particularly economical fabrication.

Now in order to implement these and still further objects of the invention, which will become more readily apparent as the description proceeds, the invention contemplates providing at each housing of the components of the bus bars two oppositely situated connecting flanges and within each housing there is arranged an internal conductor element. The internal conductor elements bear against one another and at least a number thereof within their housing are supported by an inwardly directed conical supporting insulator arranged at a connection flange, and the internal conductor elements are mechanically and electrically connectible with one another and each connection location is located beneath a flange connection. Each housing has a pressure gas tight closable mounting opening by means of which the connection location beneath the other free connection flange is accessible.

According to further features of the invention the connection of the internal conductor element occurs preferably by means of two-part clamps or threadable collars, although also each other random connection technique can be selected provided that at the released connection no parts protrude past the connection flange. At a field a bus bar or collecting rail component can be constituted by a disconnector in a T-shaped housing with at least one further connection flange, wherein in the housing a fixed contact carries the internal conductor element and a movable contact is supported by a second conical supporting insulator which is inwardly directed and arranged at the further connection flange, and another connecting rail component can be constituted by a straight connecting rail portion. The straight connecting rail portion can contain a dilatation element. The internal connector element or piece of the disconnector component is preferably constructed as a two-part element and both internal conductor portions are removably secured in the fixed contact. In a bus bar system there can be arranged between each two disconnectors a straight bus bar or collecting rail portion, wherein at least each second straight bus bar portion is constituted by one equipped with a dilatation element. The internal conductor element of each straight collecting rail portion in its housing can be formed by the internal conductor elements of the disconnector components which are flanged to the ends of the housing, wherein in each case a straight collector rail portion together with a merging disconnector component forms a pressure gas tight compartment. Instead of this arrangement it is also possible for the internal conductor element or piece of each straight bus bar portion to be supported in its housing by an inwardly directed conical supporting insulator which is arranged at a connection flange and the housings of the bus bar components can be arranged in series or a row at one another in such a manner that of both flanges each flange connection only exhibits the one flange of a supporting insulator, and each bus bar component forms a pressure gas tight compartment.

BRIEF DESCRIPTION OF THE DRAWINGS

The invention will be better understood and objects other than those set forth above, will become apparent when consideration is given to the following description thereof. Such description makes reference to the annexed drawings wherein.

DETAILED DESCRIPTION OF THE PREFERRED EMBODIMENTS

Figure 1:
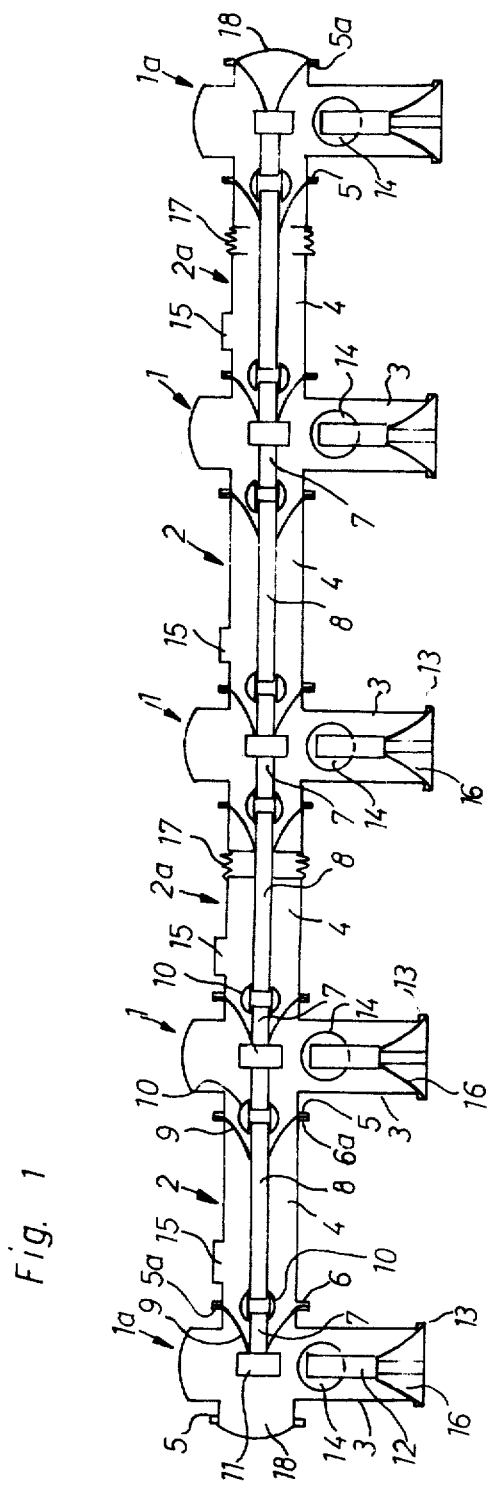
FIG. 1 is a schematic longitudinal sectional view of a bus bar or collecting rail system as contemplated by the invention.

Describing now the drawings, the bus bar or collecting rail system illustrated by way of example in FIG. 1 will be understood to comprise five disconnectors or separators 1a, 1 between each two respective ones of which there is arranged a straight collector rail component or bus bar component 2, 2a. All of the disconnectors are essentially identical in construction so that it should suffice to describe a single such disconnector or separator. Each disconnector 1, 1a possesses a substantially T-shaped housing 3, the beam portion of which carries both of the oppositely situated connection flanges 5 and 5a. At the base of the housing 3 there is a further connection flange 13. As far as the flange 5a appearing at the right-hand side of the drawing, it will be seen that there depends therefrom a substantially conical support or supporting insulator 9 which extends into the housing 3 and at which there is secured fixed contact 11 of the disconnector. At the bottom or base flange 13 there is provided a similar support or supporting insulator 16 which carries the sliding contact 12 of the disconnector. In the case of double bus bars there is provided at the disconnector housing 3 a fourth flange, at which there can be flanged the housing of a switch. The sliding contact 12 is connected with the switch (not shown) and possibly also with the sliding contact of the second bus bar disconnector. The fixed contact 11, as such has been shown in the case of the disconnectors 1, carries an internal conductor element or piece 7, both ends of which are located at the neighbourhood of the connection flanges 5, 5a of the housing 3 but do not protrude therepast. The fixed contact 11 and the internal connector element or piece 7 can be fabricated as one piece. With the illustrated exemplary embodiment the internal conductor piece 7 of the disconnector is constructed as a two-piece component or bipartite element and both of the conductor portions are removably secured, for instance by threading, in the fixed contact 11, so that at the end or terminal disconnectors 1a the internal conductor portion which is not required can be easily removed. At the outer flanges 5 and 5a of the disconnectors located at the ends of the bus bar system there are secured pressure gas tight closure plates or closure hoods, generally indicated by reference character 18.

Two constructions are provided for the straight or linear bus bar portions; a bus bar portion 2a with a dilatation element 17, for instance a bellows, and a bus bar portion 2 without dilatation element. Moreover, the linear bus bar portions 2, 2a are likewise of identical construction. The housing 4 of each linear or straight bus bar portion possesses two oppositely situated connection flanges 6, 6a. In the housing 4 there is located an internal conductor element or piece 8 which is carried by an inwardly directed conical supporting insulator 9 at the connection flange 6a located at the right-hand side of the drawing. Just as was the case for the disconnectors 1 the ends of each internal conductor element 8 extend in the housing 4 up to the region of the connection flanges 6, 6a without protruding therepast.

The mechanical and electrical connection of the internal conductor pieces or elements 7, 8 of the disconnectors and the linear bus bar portions is achieved by means of bipartite clamps or threadable collars, generally indicated by reference characters 10, 10a which, in each instance, are located beneath a flange connection and constructed such that with the connection released they are located completely in the housing and do not protrude past the connection flange.

In the disconnector housing 3 as well as in the housing 4 of the straight bus bar portion there is provided a respective mounting or assembly opening 14 and 15 which can be sealed in a gas tight fashion and which is located at one such housing portion such that there is accessible for the assembly and disassembly via the mounting or assembly opening the connection at the end of the internal conductor piece 7 or 8 respectively which is not supported by the supporting insulator 9. Such reliable pressure gas tight closable assembly or mounting openings can be easily produced at the housings.

In each bus bar component, disconnector, as well as the linear bus bar portion the internal conductor piece 7, 8 is only held by a supporting insulator which forms a pressure gas tight bulk-head or partition at a connection flange, whereas the oppositely situated connection flange at the housing itself is open and is closed by the supporting insulator carrying the internal conductor piece at the bounding component, so that each component in the bus bar system forms a pressure gas tight compartment.

Figure 2:
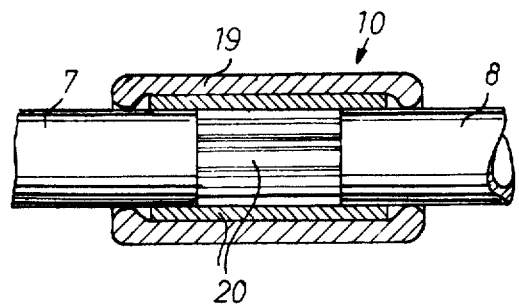
FIG. 2 illustrates details of an internal conductor-connection.
Figure 3:
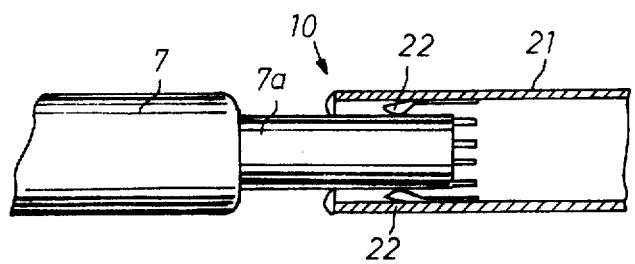
FIG. 3 illustrates details of an internal conductor-connection according to a different embodiment of the invention.

For the disassembly of a component it is only necessary to open its mounting opening and the mounting opening of the component bounding at the flange with the internal conductor-support insulator and to disconnect the connections to the internal conductor element. Just as easy is the reassembly or installation. The bus bar system can be disconnected at one location and can be supplemented or amplified by means of one or a number of fields or zones each having a disconnector and a straight bus bar portion. In this regard at least each second field in the system possesses a linear bus bar portion with dilatation element, so that the thermal expansion can be reliably taken-up. The connection of the internal conductor elements with one another, as mentioned, can occur by means of any type of connection devices which satisfy the here existing requirements. Previously there were mentioned the clamps. Particularly suitable are plug connections, preferred embodiments of which have been illustrated in FIGS. 2 and 3. With the plug connection of FIG. 2 the internal conductor elements or pieces 7 and 8 are of cylindrical shape and have the same diameter. The connection device 10 consists of a tubular element 19 which carries at its inside axially parallel contact lamellae or fingers 20, a so-called multi-contact. The tubular element 19 can be pushed onto the internal conductor pieces or elements 7, 8. A releasable or removable lock (not shown) at one internal conductor piece retains the tubular element 19 in its connection location, a locking element or lock at the other internal connector piece is not necessary. The connection device 10 illustrated in FIG. 3 consists of a tubular element 21 which carries at both ends at the inside a respective crown or rim of tulip contacts 22. The outside diameter of the tubular element 21, with this embodiment, is equal to the outside diameter of the internal conductors 7, 8, the ends 7a of which are stepped or offset, so that they fit into the tulip contacts 22.

Figure 4:
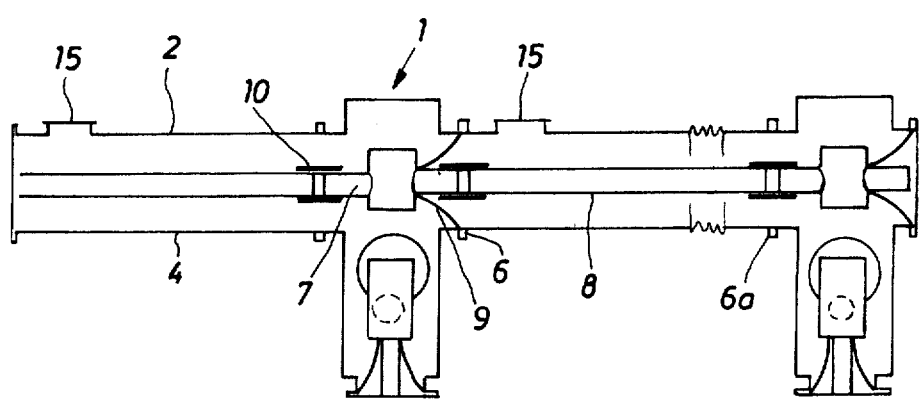
FIG. 4 illustrates a modified embodiment from the showing of FIG. 1 of two fields or zones of a bus bar system.

FIG. 4 shows in sectional view two fields or zones of a bus bar system with a respective disconnector 1 are the same as discussed above with regard to the embodiment of FIG. 1. The housing 4 of the straight bus bar portion 2, 2a possesses at its ends the connection flanges 6, 6a and a pressure gas tight closable mounting opening 15 and the housing 2a additionally possesses a dilatation element 17, for instance constructed as a bellows. The internal conductor piece 8 however is retained in the housing 14, not as was the case for the embodiment of FIG. 1 by a supporting insulator, rather solely by the internal conductor pieces 7 which carry at both housing ends the flanged disconnector 1. When the components are flanged against one another the internal compartment of the straight bus bar portion 2 is always closed at one end, in the showing of the drawing the left-end, by the supporting insulator 9 of the disconnector 1 which is connected therewith. At the other end the internal compartment of the straight bus bar portion merges with the disconnector compartment. This disconnector then together with the straight bus bar portion in each instance forms a pressure gas tight compartment of the bus bar system. Such embodiment is particularly economical in the case of smaller bus bar systems with short and slightly linear internal conductor pieces 8 since expensive supporting insulators can be saved and the connection devices 10 need not be massively constructed, so that there can be accepted the now larger gas space of a compartment.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A gas-blast insulated, excapsulated high-voltage switching installation with removable bus bars, in which switching installation the installation components which comprise housings with flange connections and internal components secured in the form of partitions in such housings by means of conical supporting insulators form pressure gas tight compartments, and wherein the bus bars contain disconnectors as well as dilatation elements, the improvement comprising two oppositely situated connection flanges provided at each housing of the bus bar components, an internal conductor element arranged in each housing, the internal conductor elements bearing against one another and at least a number thereof being supported in their housing by an inwardly directed conical supporting insulator arranged at a connection flange, means for mechanically and electrically coupling the internal conductor elements with one another and each connection location being located beneath a flange connection, each housing containing a pressure gas tight closable mounting opening by means of which the connection location beneath the other free connection flange is accessible.

2. The switching installation as defined in claim 1, wherein one bus bar component is a disconnector which is arranged in a substantially T-shaped housing equipped with at least one further connection flange, and wherein in said housing a fixed contact held by a supporting insulator carries an internal conductor element and a movable contact is held by a second inwardly directed conical supporting insulator arranged at further connection flange, and another bus bar component is constituted by a straight bus bar portion.

3. The switching installation as defined in claim 2, wherein the straight bus bar component contains a dilatation element.

4. The switching installation as defined in claim 1, wherein said coupling means comprise bipartite clamp means provided for the connection of the internal conductor elements.

5. The switching installation as defined in claim 1, wherein said coupling means comprise threadable collars provided for the connection of the internal conductor elements.

6. The switching installation as defined in claim 1, further including plug connectors with substantially tulip-shaped contacts provided for the connection of the internal conductor elements.

7. The switching installation as defined in claim 1, further including substantially ring-shaped arranged multi-contacts provided for the connection of the internal conductor elements.

8. The switching installation as defined in claim 2, wherein the internal connector element of the disconnector component is bipartite in construction defined by two portions and both internal connector portions can be removably secured in the fixed contact.

9. The switching installation as defined in claim 1, wherein a substantially straight bus bar portion is arranged in the bus bar system between each two disconnectors, and at least each second straight bus bar portion defines a bus bar portion equipped with a dilatation element.

10. The switching installation as defined in claim 9, wherein the internal conductor element of each substantially straight bus bar portion in its housing is held by the internal conductor portions of the disconnector components flanged at the ends of the straight bus bar component, and wherein a straight bus bar component together with a subsequently merging disconnector-component forms a pressure gas tight compartment.

11. The switching installation as defined in claim 9, wherein the internal conductor element of each straight bus bar component in its housing is held by an inwardly directed conical supporting insulator and arranged at a connection flange, and the housings of the bus bar components are arranged in a row next to one another in such a manner that of both flanges each flange connection only possesses the one flange of a supporting insulator, and each bus bar component forms a pressure gas tight compartment.

* * * * *